United States Patent
Neuenschwander

[19]

[11] Patent Number: 5,881,450
[45] Date of Patent: Mar. 16, 1999

[54] DUAL ACTION INDEXING SYSTEM AND METHOD FOR A DIE ASSEMBLY

[75] Inventor: Thomas R. Neuenschwander, Fort Wayne, Ind.

[73] Assignee: L.H. Carbide Corporation, Fort Wayne, Ind.

[21] Appl. No.: 759,478

[22] Filed: Dec. 5, 1996

[51] Int. Cl.⁶ .................................................. H01F 41/06
[52] U.S. Cl. .................................. 29/609; 29/598; 29/596
[58] Field of Search ........................... 29/609, 598, 738, 29/732, 564.1, 564.6, 596; 74/665 L, 665 M, 417, 665 P; 475/220, 228, 230

[56] References Cited

U.S. PATENT DOCUMENTS

| | | | |
|---|---|---|---|
| 3,203,077 | 8/1965 | Zimmerle | 29/155.5 |
| 4,597,168 | 7/1986 | Oboshi | 29/596 |
| 4,615,207 | 10/1986 | Oboshi | 72/404 |
| 4,619,028 | 10/1986 | Neuenschwander | 29/33 |
| 4,640,166 | 2/1987 | Mizukado et al. | 83/582 |
| 4,704,184 | 11/1987 | Oboshi | 156/512 |
| 4,723,360 | 2/1988 | Endo | 29/732 |
| 4,738,020 | 4/1988 | Neuenschwander | 29/738 |
| 4,832,658 | 5/1989 | Hendershot et al. | 464/160 |
| 5,087,849 | 2/1992 | Neuenschwander | 29/598 |
| 5,123,155 | 6/1992 | Neuenschwander | 29/596 |
| 5,163,217 | 11/1992 | Sakanishi | 29/609 |
| 5,377,115 | 12/1994 | Neuenschwander | 364/468 |

FOREIGN PATENT DOCUMENTS

| | | | |
|---|---|---|---|
| 58-183734 | 5/1985 | Japan. | |
| 434899 | 9/1935 | United Kingdom | 74/665 M |

*Primary Examiner*—Daniel B. Moon
*Assistant Examiner*—James P. Calve
*Attorney, Agent, or Firm*—Baker & Daniels

[57] ABSTRACT

A dual action indexing system and method for relatively rotating a lamina and a partial lamina stack in a progressive die assembly. The dual action indexing system includes a mechanical indexer such as a roller gear cam which provides a large indexed rotational movement to correct for thickness inconsistencies in the laminas and a relatively small and fast servo motor to provide a small indexed rotational movement to provide a desired skew angle. The rotational movements of the mechanical indexer and servo motor are combined by a phase adjuster. The combined rotational movement is used to rotate a choke barrel into which the laminas are punched to form a lamina stack. The operation of the servo motor is regulated by a controller and may thereby be conveniently and rapidly adjusted.

25 Claims, 7 Drawing Sheets

DUAL ACTION INDEXING SYSTEM AND METHOD FOR A DIE ASSEMBLY

BACKGROUND OF THE INVENTION

1. Field of the Invention

The present invention relates generally to laminated parts for use in electric motors and generators. More particularly, the present invention relates to electric motor or generator stators and rotors having stacked laminas and the methods and machines, i.e., progressive dies and controllers therefor, used in the manufacture of such laminated parts.

2. Description of the Related Art

The manufacture of stators and rotors employing stacked laminas is well known in the art. Typically, the laminas are blanked from a continuous strip stock and then stacked and bound together to form the stator or rotor. Progressive die assemblies for producing stator or rotor laminations wherein a strip of lamination material is fed through a sequence of punching steps to progressively form the laminas are also well known.

Rotor laminas generally include a plurality of skewed conductor slots which are formed around the periphery of the rotor stack in arcuately spaced relation to one another by rotationally indexing the laminas with respect to the rotor stack axis. Indexing involves rotating the rotor stack and the last produced lamina relative to each other by a predetermined rotational increment so that, when the laminas are combined in a stack, the rotor conductor bar slots defined by adjacent conductor slots are skewed or slanted relative to the stack axis. Stator stacks, on the other hand, include winding slots around the inner periphery of the stack which extend parallel to the stack axis, without skew, and are shaped to receive the stator windings. Although relatively rare, inside-out motors are often used in fan motor designs and utilize inner cores manufactured with straight slots to be used with outer cores having skewed slots, in which case it would be the outer core laminations which are rotated relative to each other to produce the skew angle.

In addition to producing a skew angle, as discussed above, the relative rotation of a lamina and the lamina stack onto which the lamina will be placed can be used to overcome the negative effects created by thickness inconsistencies in the strip stock from which the laminas are blanked. The strip stock used to manufacture lamina stacks may have thickness inconsistencies wherein one side of the strip stock is thicker than the other side. If laminas punched from the strip stock are stacked without rotation, the lamination stack produced will not have a uniform height around its entire perimeter because the stacking of the individual laminas will additively compound the thickness inconsistencies present in the strip stock on one side of the stack. A stack having a substantially uniform height can be produced, however, by rotating individual laminas relative to the lamina stack to equally distribute the thickness inconsistencies about the stack axis. The inconsistencies thereby cancel each other out in a known process often referred to as gamma correction.

In response to these problems, an autorotation system to compensate for nonuniform stock thickness was developed which both rotates and interlocks the stacked laminas. This system compensates for variations in lamina thickness while properly skewing the conductor slots of rotor laminas, as described in U.S. Pat. Nos. 4,619,028; 4,738,020; 5,087,849 and 5,123,155, all assigned to the assignee of the present invention and the disclosures of which are incorporated herein by reference. In the systems disclosed in the aforementioned patents, the choke barrel holding the lamination stack is automatically rotated before each lamina is blanked from the strip stock and the lamina's circumferentially disposed tabs are interlocked with the slots of the uppermost lamina of the incomplete lamination stack within the barrel.

In the apparatus and method disclosed in the aforementioned patents, the individual laminas are typically rotated through an angle which is the sum of 180° to provide for gamma correction plus a smaller incremental amount necessary to provide the proper skew angle. Although the laminas may be rotated through other angles, the angle, without including the incremental rotation necessary to produce the skew angle, must be at least 360°/(number of interlock tabs) to permit the use of interlocking tabs and slots.

The use of an AC or DC servo motor and a controller allows the operator of the die assembly to rapidly and easily alter the rotational amounts to produce different skew angles or to alter the angle through which the laminas are rotated to correct for thickness inconsistencies. The controller computes a single angle through which the choke barrel must be rotated to provide for both gamma correction and a proper skew angle. The use of a servo motor to rotate a choke barrel for such purposes, however, places a limit on the number of strokes per minute of the die assembly because it requires the use of a relatively large, and relatively slow, servo drive unit which has the capacity to handle the inertial loads involved in rotating the choke barrel through such large angles between each stroke of the die assembly as well as to be sufficiently accurate. Typical achievable rates are 275 to 300 strokes/minute.

Mechanical indexers which utilize a camming assembly such as a roller cam to provide indexed rotational movements to rotate the choke barrel are also known and may be used to provide for gamma correction while allowing the die assembly to operate at significantly higher rates, e.g., in the range of 400 to 500 strokes/minute, than a comparable servo drive assembly. Mechanical indexers used for gamma correction lack the flexibility of servo drive systems, however, since the angle at which they rotate the choke barrel cannot easily be adjusted.

A mechanical system has also been developed to provide for the incremental indexing of laminas to provide a proper skew angle and U.S. Pat. No. 3,203,077 provides one example. Although such a mechanical system provides for some adjustment of the amount of rotational indexing necessary for a skew angle, the adjustment of mechanical indexing systems is not as flexible or convenient as the adjustment of a servo drive motor which is regulated by a controller.

A system which utilizes a modified roller cam assembly to provide a mechanical indexer in conjunction with a system for providing an incremental rotational movement for producing a skew angle is disclosed by U.S. Pat. No. 5,163,217. The disclosed system, however, cannot employ a standard "off the shelf" roller cam assembly without substantially modifying the assembly thereby increasing the cost of the system. The disclosed system also employs a plurality of small rollers which are in frictional contact between an input roller and an output disk. The use of such frictionally engaged surfaces to transmit rotational movements is more subject to slippage than an arrangement involving the transfer of rotational movement by positively locking gear teeth.

What is needed is a system for relatively rotating a lamina and a stack which overcomes the limitations of the prior art.

SUMMARY OF THE INVENTION

The present invention provides a lamination indexing system which relatively rotates individual laminations with respect to a stack of laminations using both a mechanical indexer having a conventional roller cam assembly and a servo drive unit. By using a mechanical indexer to provide the larger rotational angle necessary to correct for thickness inconsistencies, a small, fast, and accurate servo drive motor can be used to provide the rotational indexing necessary to obtain the proper skew angle. The combination of these two rotation systems is made possible by using a phase adjuster which permits the combination of the two separate rotational outputs provided by the respective systems.

An advantage of the present invention is that a lamina and a lamina stack may be relatively rotated in the approximate range of 400 to 500 cycles/minute to provide for both gamma correction and the incremental indexing necessary to provide a desired skew angle which is much faster than a system employing only a large servo drive motor. The increased rate of operation is made possible because both the mechanical indexer and the small servo drive motor are faster than a large servo drive motor and the phase adjuster allows the mechanical indexer and small servo drive motor to simultaneously rotate the choke barrel.

Another advantage of the present invention is that it permits operation of the die assembly at higher rates than those obtainable with a die assembly having a large servo motor in isolation while still providing the ability to properly index the laminas to produce a desired skew angle.

Yet another advantage of the present invention is that it permits operation of the die assembly at higher rates than those obtainable with a die assembly having a large servo motor while still providing the ability to rapidly and conveniently alter the skew angle.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention, in one form, and such exemplification is not to be construed as limiting the scope of the invention in any manner.

DESCRIPTION OF THE PRESENT INVENTION

The embodiment disclosed below is not intended to be exhaustive or limit the invention to the precise form disclosed in the following detailed description.

Figure 1:
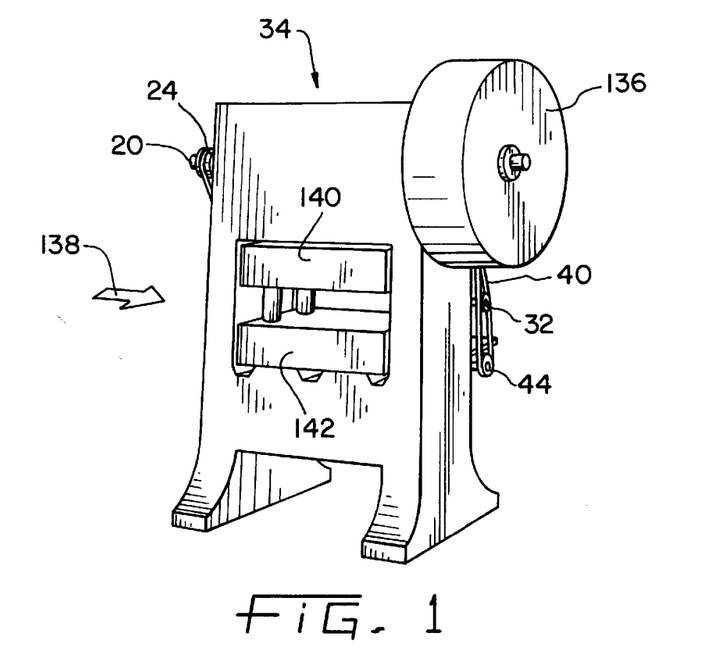
FIG. 1 is a schematic perspective view of a punch press assembly.

A die assembly or punch press 34 is shown in FIG. 1. A sheet of stock material is fed in the direction of arrow 138 between upper die block 140 and lower die block 142. As the sheet stock progresses through the die assembly 34 lamina features are sequentially stamped at different punching stations to thereby form laminas. At one station, a rotatable choke barrel receives the laminas as they are punched free of the strip stock material. The punches used to stamp the laminas are attached to upper die block 140 which is vertically reciprocated. Press crankshaft 20 transmits the power necessary to reciprocate upper die block 140 and has a flywheel disposed within flywheel housing 136 at one end and a first timing sprocket 24 located at an opposite end.

Figure 2:
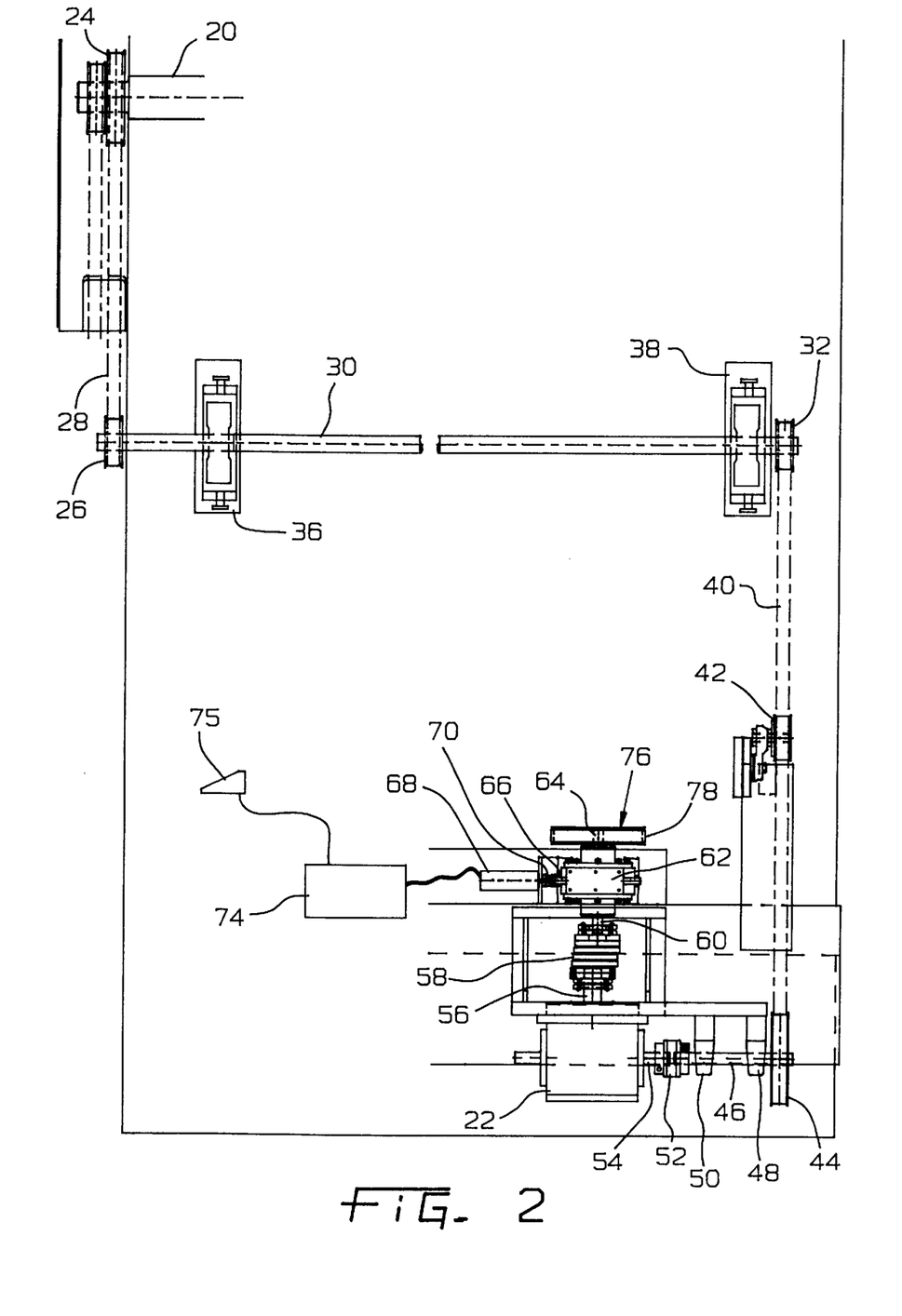
FIG. 2 is a front elevational view of a dual action indexing system.
Figure 3:
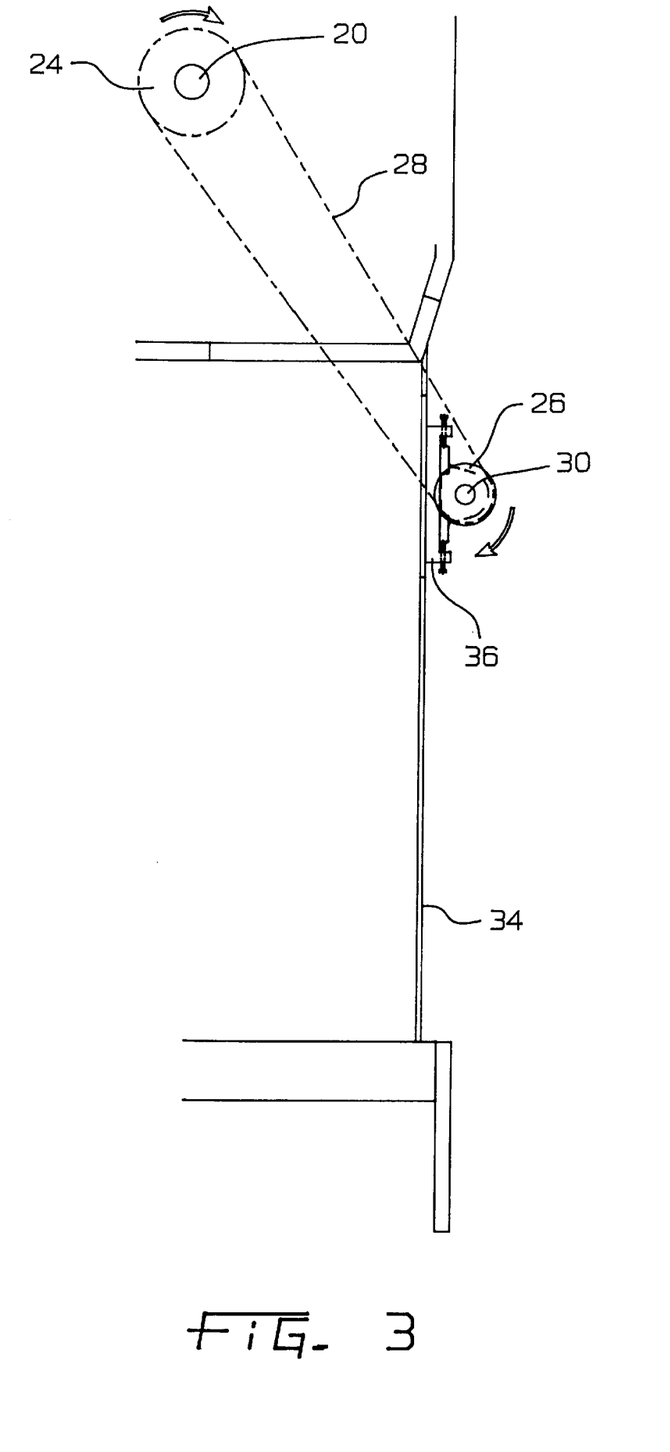
FIG. 3 is a side elevational view of the dual action indexing system.
Figure 4:
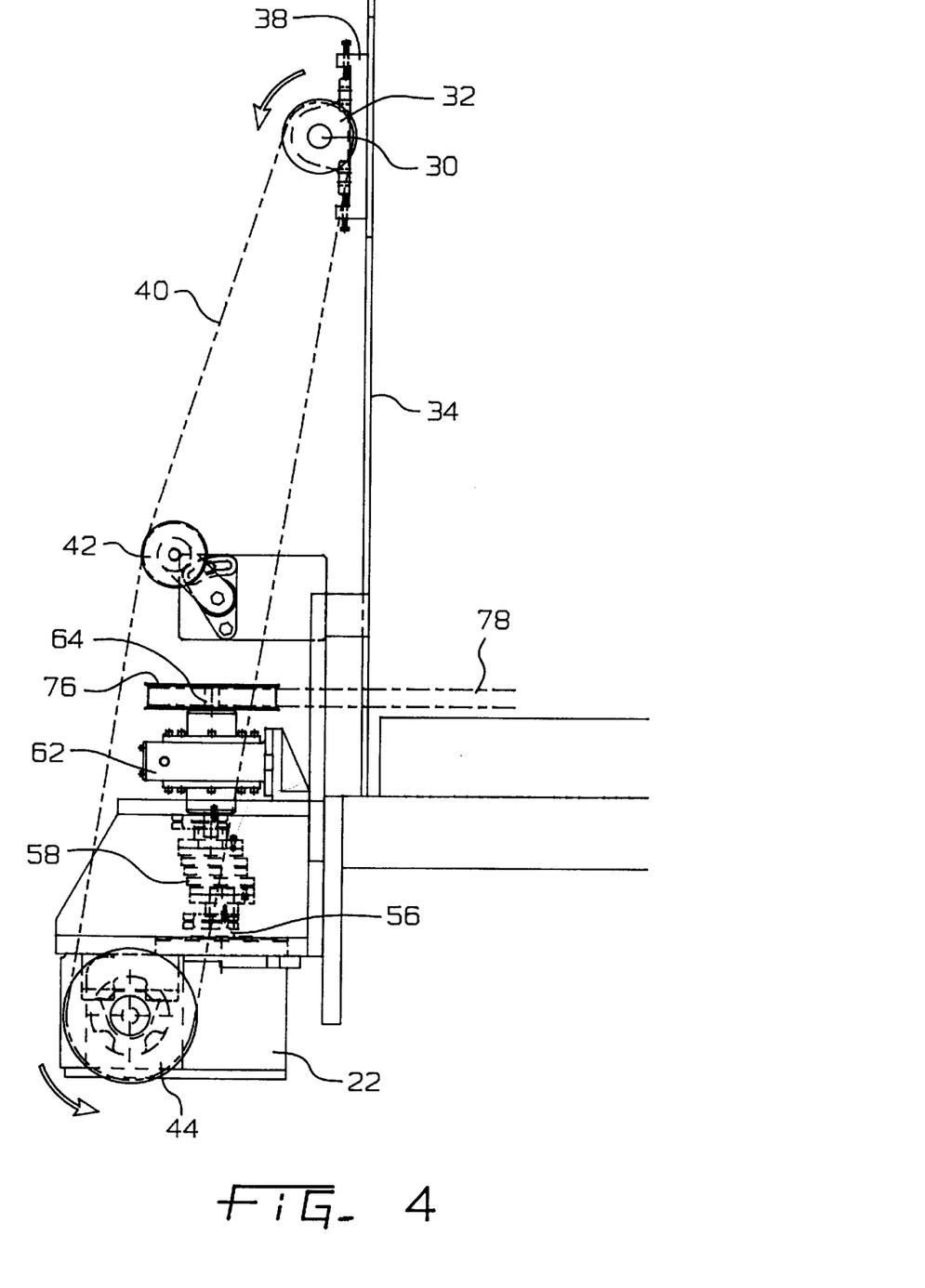
FIG. 4 is a side elevational view of a power takeoff for the dual action indexing system.

As can be seen in FIG. 2 and 3 a series of timing sprockets and shafts are used to transfer power from the crankshaft 20 of the punch press or die assembly to mechanical indexing drive 22. A first timing sprocket 24 is attached to crankshaft 20 and transfers power to second timing sprocket 26 via first timing belt 28. Second timing sprocket 26 rotates first jack shaft 30 which has a third timing sprocket 32 located opposite second timing sprocket 26. First jack shaft 30 is attached to the die assembly 34 with first and second pillow blocks, 36 and 38, respectively. The power takeoff from the press crankshaft 20 could also occur on the side of the die assembly 34 at which third timing sprocket 32 is located to avoid the use of first jack shaft 30. Use of a first jack shaft 30 can be advantageous for some die assemblies 34 when it is desirable to avoid taking power from the end of the press crankshaft 20 which has a flywheel attached thereto.

Power is transferred from third timing sprocket 32 via second timing belt 40. Second timing belt 40 is kept properly tensioned with idler pulley 42 and transfers power to fourth timing sprocket 44. Fourth timing sprocket 44 rotates second jack shaft 46 which is supported by third and fourth pillow blocks, 48 and 50, respectively. First coupling 52 attaches second jack shaft 46 to the input shaft 54 of the indexing drive 22. The timing sprockets 24, 26, 32 and 44 are sized to provide the proper final drive ratio between the press crank shaft 20 and the indexing drive 22. Indexing drive 22 has an internal camming assembly which transforms the substantially constant rotational input of input shaft 54 into indexed rotational movements of 180° which are separated by dwell periods. The indexed rotational movements are transmitted by output shaft 56.

The operation of indexing drive 22 is conventional and well known. Such indexing drives are available for different amounts of rotational movement between each dwell period. Indexing drives dwell and index in a repetitive, alternating pattern of dwell, index, dwell, index, . . . etc. During the "dwell" periods the output shaft is at rest and during the "indexing" periods the output shaft is rotated a predetermined amount which is dependent upon the design of the camming assembly of the indexing drive. One full cycle, i.e., one dwell and one index period, typically requires one full turn of the input shaft.

Figure 9:
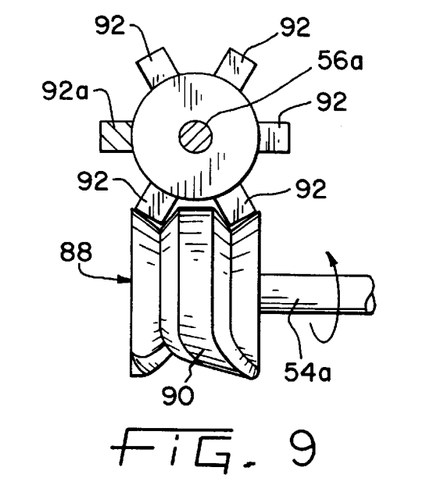
FIG. 9 is a schematic representation of a roller cam in a dwell period.
Figure 10:
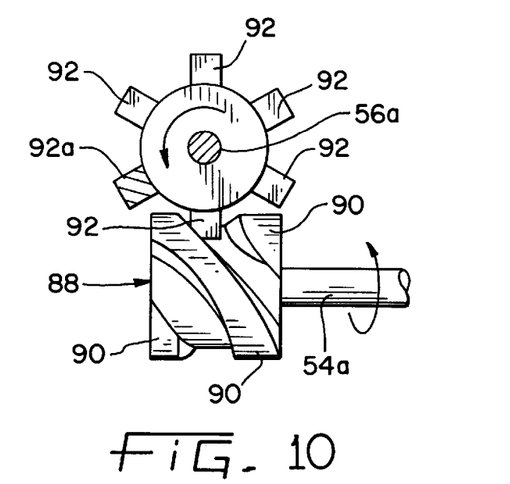
FIG. 10 is a schematic representation of a roller cam in an indexing period.

The operation of a roller cam assembly is illustrated in FIGS. 9 and 10. Input shaft 54a is rotated at a constant rate due to the action of roller gear cam 88 and cam followers 92. FIG. 9 shows the roller cam assembly during a dwell cycle. During the dwell cycle the input shaft 54a rotates but the output shaft 56a is at rest since camming rib 90 maintains cam followers 92 in a stationary position. FIG. 10 illustrates the indexing cycle of the roller gear assembly. As the roller gear cam is rotated further from the position shown in FIG. 9, the configuration of camming ribs 90 are altered and camming rib 90 causes the movement of cam followers 92.

Mechanical indexers employed in die assemblies typically rotate through an angle of either 60°, 90°, 120° or 180° during each cycle. It is also possible, however, to employ indexing drives with other angles of rotation. Sankyo America, Inc., 10655 State Route 47, P.O. Box 4338, Sidney, Ohio, 45365 supplies a line of indexing drives under the brand name Sandex, including shaft type models having an indexing rotation period of 180° and which can be used as mechanical indexing drive 22 in the illustrated embodiment.

When a mechanical indexing drive 22 having an indexing rotation period of 180° is used, the indexing drive output shaft 56 is repetitively, cyclically rotated in index periods of 180° separated by motionless dwell periods as described above. The timing sprockets 24, 26, 32 and 44 are designed to rotate the input shaft 54 of the indexing drive in coordination with the operation of the die assembly whereby the die assembly will perform punching operations during the dwell periods. Thus, the mechanical indexer output shaft 56 will be at rest during the time in which a lamina is punched free of the strip stock and pushed into choke barrel 80.

Figure 14A:
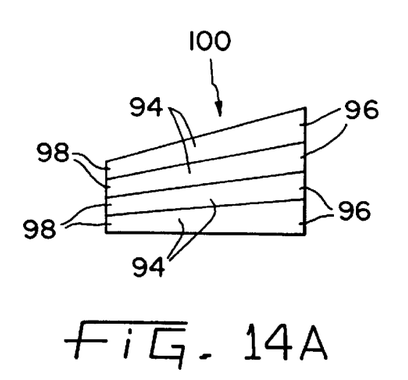
FIG. 14a is a schematic elevational view of a lamina stack having a non-uniform height.
Figure 14B:
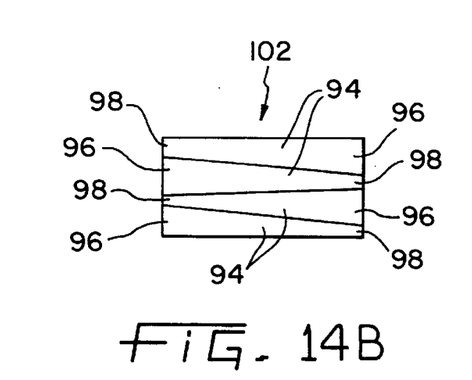
FIG. 14b is a schematic elevational view of a lamina stack having a substantially uniform height.

The rotational output of the mechanical indexing drive 22 is used to rotate a choke barrel through an angle of 180° to thereby relatively rotate sequentially stacked laminas by 180° and correct for thickness inconsistencies in the strip stock material. FIG. 14a shows schematically, and at an exaggerated scale, how thickness inconsistencies in the strip stock material can be compounded when individual laminas are stacked. The individual laminas 94 have a thicker edge 96 and a thinner edge 98 so that when the laminas are stacked without rotation a lamina stack 100 having a non-uniform height results. FIG. 14b illustrates how relatively rotating each of the individual laminas by 180° can correct for the thickness inconsistencies of the strip stock material and provide a lamina stack 102 having a substantially uniform height. It is also possible to relatively rotate each of the laminas by other angles, provided that the thickness inconsistencies are equally distributed about the stack axis.

Figure 7:
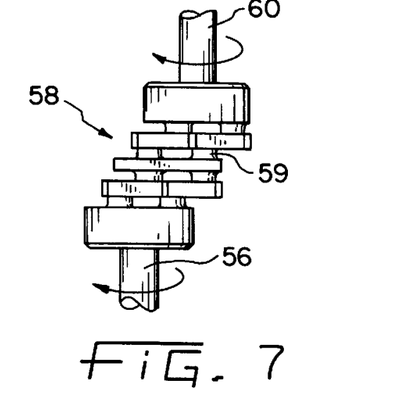
FIG. 7 is an elevational view of a Schmidt coupling.
Figure 8:
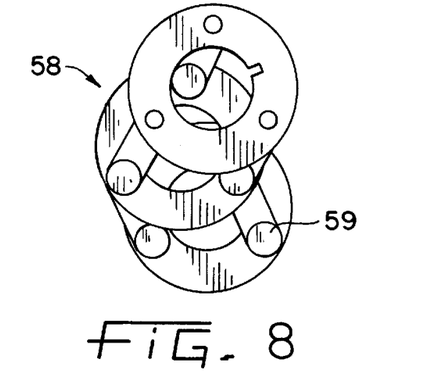
FIG. 8 is a plan view of a Schmidt coupling.

A Schmidt coupling 58 connects the output shaft 56 of the indexing drive to the input shaft 60 of the phase adjuster 62. As can be seen in FIGS. 7 and 8, Schmidt coupling 58 permits the transmission of rotational movement between parallel but slightly offset shafts 60 and 62 through a plurality of linkages 59 in a well known manner. Zero-Max/Helland, Motion Control Products, 13200 Sixth Avenue North, Minneapolis, Minn., 55441-5509 supplies a variety of Schmidt couplings including models which permit the coupling of parallel but misaligned shafts and which are suitable for use as Schmidt coupling 58 in the illustrated embodiment. The Schmidt coupling 58 transmits the indexed rotation of output shaft 56 to the phase adjuster input shaft 60.

The phase adjuster 62 also has an output shaft 64 and control shaft 66. A second coupling 70 is used to couple the output shaft 72 of servo drive motor 68 to the control shaft 66 to thereby rotate control shaft 66. The operation of the servo drive motor 68 is in turn regulated by a controller 74.

Figure 11:
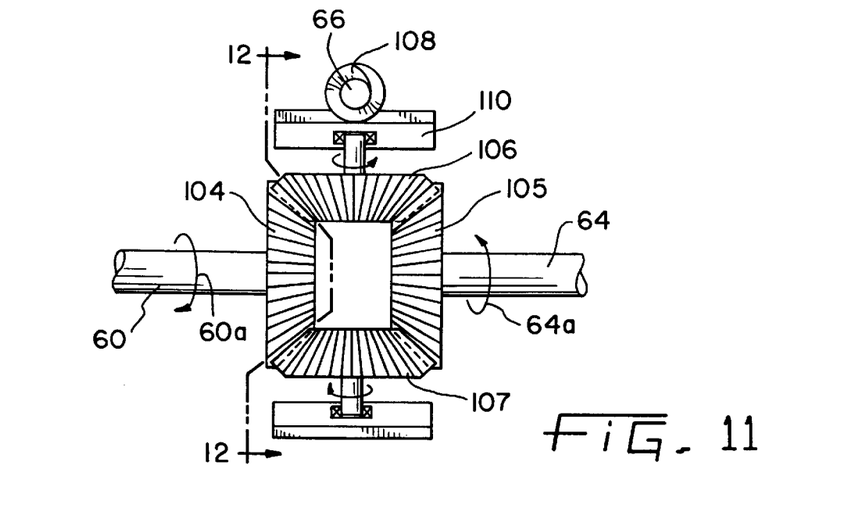
FIG. 11 is a schematic view of a phase adjuster.
Figure 12:
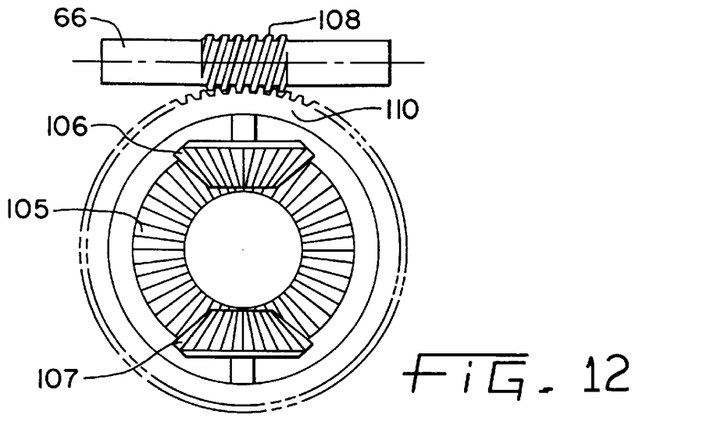
FIG. 12 is a schematic cross sectional view of the phase adjuster of FIG. 11 taken along line 12—12 of FIG. 11.

The rotation of phase adjuster output shaft 64 can be either advanced or retarded with respect to the rotation of phase adjuster input shaft 60 by means of control shaft 66. The manner in which the rotational inputs of input shaft 60 and control shaft 66 are combined is schematically illustrated in FIGS. 11 and 12. The rotation of the input shaft 60 is transferred to output shaft 64 by the interaction of a plurality of bevel gears 104, 105, 106, 107. The bevel gears 104, 105, 106, 107 also reverse the rotational movement of input shaft 60, designated by arrow 60a, during transmission of rotational movement to output shaft 64 which rotates in the direction of arrow 64a, i.e. shaft 64 rotates in the opposite direction of shaft 60. Control shaft 66 includes a worm gear 108 which engages ring gear 110. Bevel gears 106, 107 are rotatably mounted on the interior of ring gear 110 and rotate with ring gear 110 about the common axis of shafts 60, 64 when worm gear 108 is rotated. Rotation of the ring gear 108 can be in either direction and can, therefore, cause the rotation of shaft 64 in either direction. The rotation of ring gear 110 and input shaft 60 can occur simultaneously and both of these rotational movements will be combined to produce a single rotational movement of output shaft 64 which is the sum or difference of the rotational movements. Thus, rotation of control shaft 66 can be used to either increase or decrease the rotational movement of output shaft 64 relative to input shaft 60.

Figure 13:
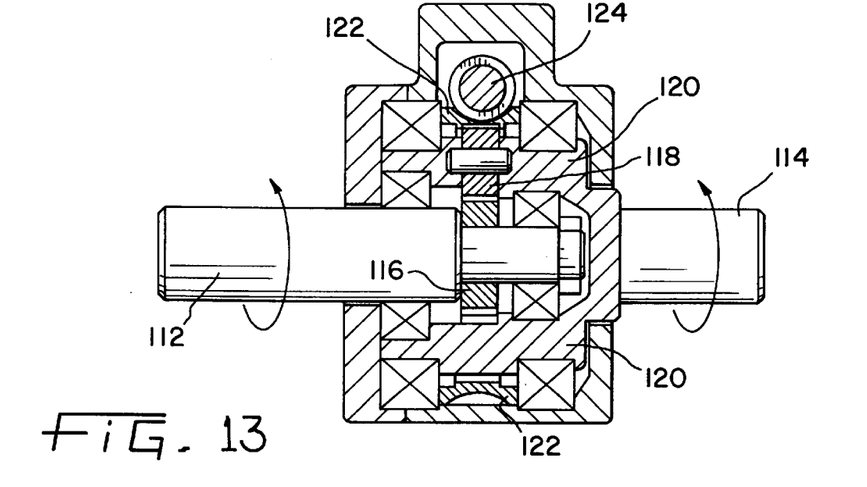
FIG. 13 is a schematic cross sectional view of a second phase adjuster.

An alternative gearing arrangement for combining the rotational movements of two input shafts into a single rotational movement is schematically illustrated in FIG. 13. The phase adjuster shown in FIG. 13 uses a planetary gear arrangement in which the rotational directions of the major input shaft 112 and the output shaft 114 are not opposed. A sun gear 116 is located on the input shaft 112 which intermeshes with planet gears 118 disposed on a planet carrier 120 rotatably fixed to the output shaft 114. Rotation of the sun gear 116 causes the planet gears 118, and planet carrier 120 to orbit the sun gear 116 in the same rotational direction as the sun gear 116 is rotated. The movement of the planet carrier 120 can be either advanced or retarded by the rotation of a ring gear 122 which surrounds and engages the planet gears 118 and is also engaged on its exterior circumference by a worm gear 124. Worm gear 124 is used to control the movement of ring gear and the worm gear 124 may be, in turn, coupled to a control shaft. Thus, the rotational movements of the input shaft 112 and the control shaft, i.e., worm gear 124, are combined and transmitted via the output shaft 114.

Both of the phase adjuster embodiments discussed above use positively engaging gears to transfer and combine the rotational movements from two input shafts to a single output shaft. Thus, no slippage exists in the transmission of the rotational movements and, by the use of precision gears, backlash can be minimized.

Phase adjusters are readily available and Model Number DD-5A-LS manufactured by Dynamics Manufacturing of 4401 Jackman Rd. Toledo, Ohio 43612 can be used as phase adjuster 62 in the illustrated embodiment. Andantex U.S.A., Inc., 1705 Valley Road, Wanamassa, N.J., 07712 and A. Fisher, Tool and Machine Works, 5617 W. Grand Ave., Chicago, Ill. 60639 also manufacture phase adjusters which could be used in a die assembly embodying the present invention.

Figure 5:
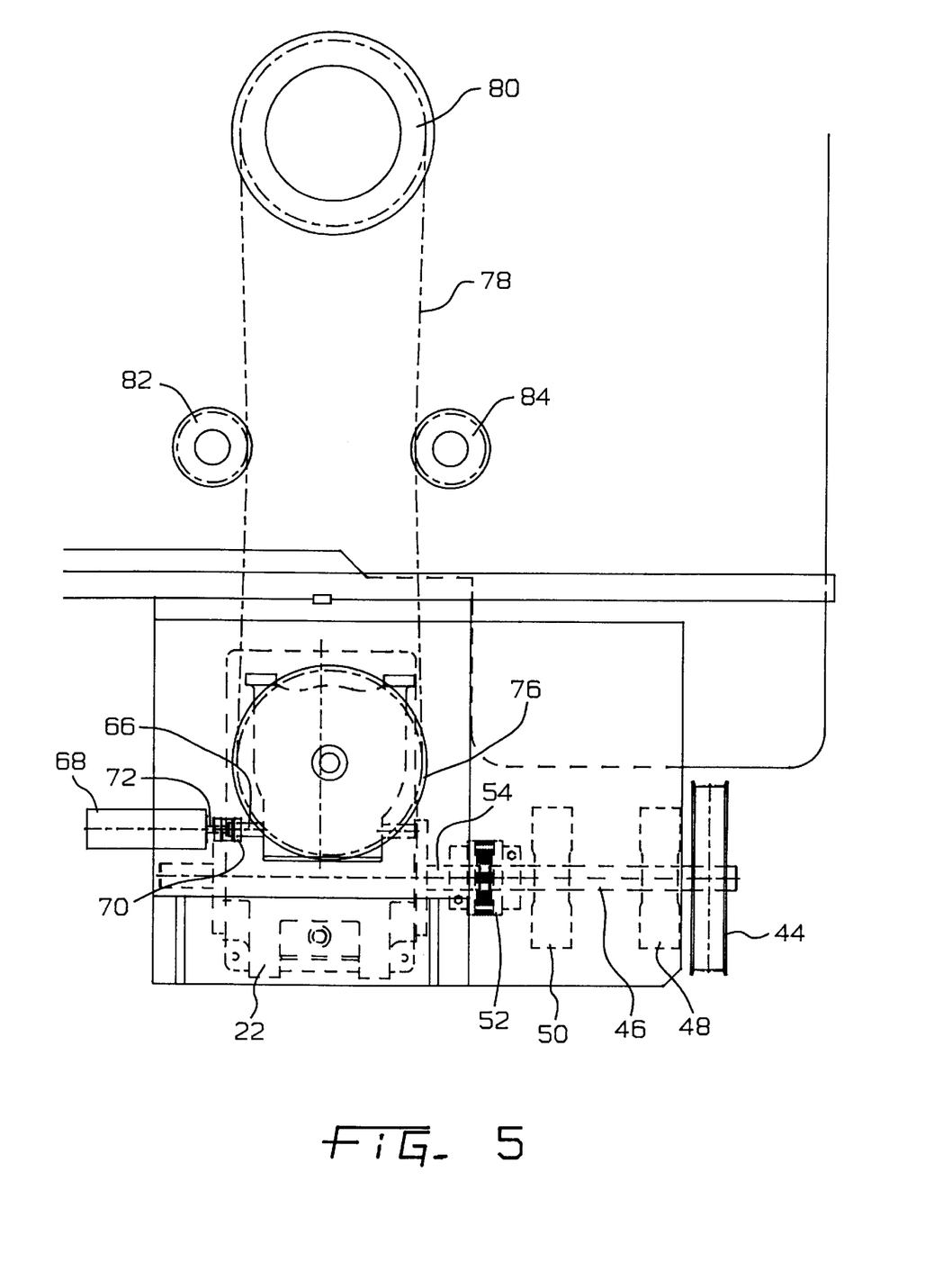
FIG. 5 is a partial plan view of the dual action indexing system.

Referring further to FIGS. 2 and 5, fifth timing sprocket 76 is attached to output shaft 64 and is thus rotated by an amount determined by both the indexed rotation of the indexing drive output shaft 56 and the rotation of control shaft 66.

The rotational output of phase adjuster 62 is thereby transferred by a third timing belt 78 which engages fifth timing sprocket 76. Third timing belt 78 also engages and controls the position of rotatable choke barrel 80. The third timing belt 78 is tensioned by first and second rotating members, 82 and 84, respectively.

Figure 6:
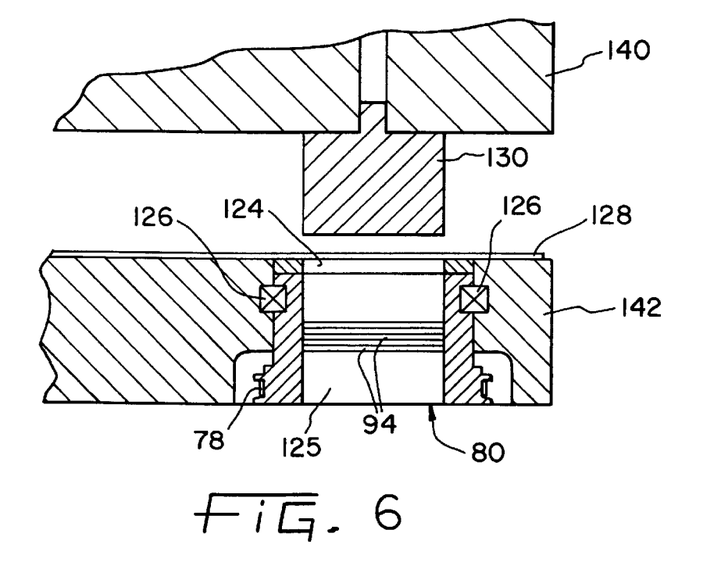
FIG. 6 is a schematic cross sectional view of a rotatable choke barrel.

Choke barrel 80 is shown schematically in FIGS. 5 and 6. The rotatable choke barrel 80 is disposed in the lower die block 142 and has a choke ring bore hole 125 which extends therethrough. The rotatable choke barrel holds a partial lamina stack comprised of individual laminas 94 which are punched free of strip stock material 128 and into engagement with the uppermost lamina in choke barrel 80 by punch 130. A carbide ring 124 located at the upper periphery of the choke barrel 80 is configured to cooperate with punch 130 in severing the individual laminas 94 from the strip stock material 128. The choke barrel 80 is rotatably supported by bearings 126 and rotated by the action of timing belt 78.

When punch 130 stamps a lamina free of strip stock material 128 during a downstroke of upper die block 140 the choke barrel 80 is at rest, i.e., undergoing a dwell period. After the stamping of the lamina, the choke barrel 80 is rotated by timing belt 78 to provide relative rotation of the individual lamina which will be stamped during the subsequent dwell period and the partial lamina stack held within the choke barrel 80.

As mentioned above, controller 74 is used to regulate the operation of servo drive motor 68. Servo drive motor 68 may be a relatively small motor and is used to rotate phase adjuster input shaft 66 to thereby advance or retard, relative to the rotational movement supplied via input shaft 60, the rotation of choke barrel 80 via phase adjuster 62, output shaft 64, fifth timing sprocket 76 and third timing belt 78. The controller 74 causes servo drive motor 68 to rotate the input shaft 66 in a series of index and dwell periods which are coordinated with the operation of the die assembly. The servo motor is operated such that a dwell period corresponds to each punching operation of the die assembly. Thus, choke barrel 80, which is rotated by the operation of both indexing drive 22 and servo drive motor 68, is at rest during each punching operation of the die assembly. The phase adjuster 62 combines the indexed rotational output of both mechanical indexer 22 and servo drive motor 68 and rotates output shaft 64 in a series of indexed movements which has a dwell period corresponding to each punching operation of the die assembly. The rotational outputs of the servo drive motor 68 and mechanical indexer 22 can occur, and be combined by the phase adjuster, either simultaneously or sequentially so long as both indexed rotational movements are completed before the next punching operation of the die assembly occurs. By having the indexed movements occur simultaneously, the time between die assembly punching operations can be reduced.

The use of a phase adjuster to combine the rotational outputs of both a mechanical indexer 22 and servo drive motor 68 permits the mechanical indexer 22 to provide the relatively large rotational increment necessary to correct for thickness inconsistencies in the strip stock and the servo drive motor 68 to provide the substantially smaller rotational increment necessary to produce a desired skew angle.

The speed of a die assembly is dependent upon a number of variables and, thus, not dependent merely upon the speed of the means employed to rotate the choke barrel. The use of a mechanical indexer to provide the rotational increment necessary to correct for thickness inconsistencies is estimated to allow a typical press punch to operate in the approximate range of 400–500 strokes per minute and the use of a small fast servo motor to provide the rotational increment necessary for the skew angle may have the capability of approximately 1,000 cycles per minute. Thus, the combination of a mechanical indexer and small servo motor, as described above, would be likely to permit press speeds in the range of 400–500 strokes per minute. This compares favorably to the use of a large servo motor to provide the rotational increments necessary to correct for thickness inconsistencies and to provide for the skew angle. The use of such large servo motors is estimated to permit a typical punch press to operate at an approximate range of 275–300 strokes per minute in a similar application, although some designs may permit speeds of up to 400 strokes per minute to be obtained. Thus, the use of a phase adjuster permits the substitution of a relatively fast mechanical indexer and faster, smaller servo motor for a relatively slower, large servo motor. Moreover, the use of a phase adjuster combines the speed advantages of a mechanical indexer with the flexibility and programmability provided by a controller and servo motor combination.

The use of controller 74 to regulate the operation of servo drive motor 68 permits the rotational increment provided by the servo drive motor 68 to be changed without disrupting the operation of the die assembly. For example, the rotational input provided by servo motor 68 could be varied between sequential punch press cycles by controller 74 without slowing the operation of the punch press if this were desired. This would be beneficial in the manufacture of a lamina stack in which not all of the laminas are skewed by the same amount. The controller 74 could also be programmed to advance rotation of the choke barrel 80 for some laminations and retard the rotation for other laminations within a single stack and thereby produce a lamina stack having a skew slot with a herringbone shape.

The controller 74 could be also be programmed to calculate the necessary rotational increment to be provided by the servo drive motor 68 based upon inputs of a desired stack height, skew angle and lamina thickness. The controller 74 can either be linked to a gauge for measuring the strip stock thickness whereby the thickness measurements would be automatically entered or the lamina thickness inputs may be manually entered by an operator using a keypad 75 connected to the controller 74. The use of controller 74 and servo motor 68 also permits the skew angle to be rapidly and easily altered without significant interruption in the operation of the die assembly, for example, by entering a new skew angle via a keypad. The alteration of the rotational increment provided by a purely mechanical rotational system could not be altered so quickly or easily.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An indexing system for a die assembly for manufacturing a stack of laminas from sheet stock material in a punch press, said stack having a desired stack height and skew angle, said stock material having a nominal thickness, said indexing system comprising:

a first indexing means adapted to be driven by a said punch press for producing a first indexing movement;

an input means for entering an input value selected from the desired stack height, skew angle, and nominal stock thickness;

a controller for generating a control signal based on said entered input value;

a second indexing means responsive to said control signal for producing a second indexing movement;

a phase adjuster comprising a plurality of interlocking gears and having a first input shaft for receiving said first indexing movement, a second input shaft for receiving said second indexing movement, and an output shaft, and wherein said interlocking gears combine said first and second indexing movements into a combined indexing output movement and transmit said combined indexing output movement to said output shaft; and a rotatable choke barrel for receiving and stacking laminas, said choke barrel rotationally coupled to said output shaft for rotation thereby in accordance with said combined indexing output movement.

2. The indexing system of claim 1 wherein said first indexing means comprises a roller cam assembly and said second indexing means comprises a servo motor.

3. The indexing system of claim 1 wherein said second indexing movement occurs simultaneously with said first indexing movement.

4. The indexing system of claim 2 wherein:

said first indexing means comprises a roller cam assembly; and said second indexing means comprises a servo motor and said controller controls the operation of said servo motor.

5. The indexing system of claim 4 wherein said second indexing movement occurs simultaneously with said first indexing movement.

6. The indexing system of claim 4 wherein said input means comprises a keypad operatively connected with said controller.

7. The indexing system of claim 4 further comprising a power transmission assembly for transferring torque from a crankshaft of the die assembly to said roller gear cam assembly.

8. The indexing system of claim 4 wherein said plurality of interlocking gears includes a worm gear coupled to said servo motor.

9. A method of relatively rotating a lamina and a partial stack of laminas in a die assembly of a punch press to manufacture a stack of laminas having a desired stack height and skew angle, said laminas having a nominal thickness, said punch press including an input means and a control, said method comprising:

a first step of providing a rotatable choke barrel for holding a partial stack of laminas;

a second step of providing a first indexing means for producing a first indexing movement in response to the operation of said punch press;

a third step of providing a second indexing means for producing a second indexing movement in response to operation of said control;

a fourth step of providing a phase adjuster comprising a plurality of interlocking gears, a first of said gears rotating in response to said first indexing movement, a second of said gears rotating in response to said second indexing movement, said gears cooperating to combine the rotations of said first and second gears to form a rotational output; and a fifth step of entering an input value selected from the desired stack height, skew angle, and nominal lamina thickness;

a sixth step of rotating said choke barrel with said rotational output prior to urging the lamina into engagement with the partial lamina stack disposed in said choke barrel based on said entered input value.

10. The method of claim 9 wherein said first indexing means comprises a roller cam assembly and said second indexing means comprises a servo motor.

11. The method of claim 10 wherein said first indexed rotational movement rotates said choke barrel through an angle of at least 30° and said sixth step further comprises determining an incremental value for said second rotational movement whereby relative rotation of the lamina and partial lamina stack through said incremental value provides a skewed conductor slot in the lamina stack.

12. The method of claim 11 wherein said input value is entered with a keypad.

13. The method of claim 10 wherein said first indexed rotational movement is substantially larger than said second indexed rotational movement.

14. The method of claim 10 wherein said first and second indexed rotational movements occur substantially simultaneously.

15. The method of claim 10 wherein said plurality of interlocking gears includes a worm gear which is rotated through said first indexed rotational movement.

16. The method of claim 10 wherein said first indexed rotational movement rotates said choke barrel through an angle of 180°.

17. A method of manufacturing a stack of laminas in a stamping apparatus, said stack having a desired stack height and skew angle, said laminas having a nominal thickness, said stamping apparatus including a control, a stamping press, and first and second indexing means, said first indexing means coupled to and receiving an input from said stamping press, said method comprising;

stamping a first lamina;

stamping a second lamina;

operating said first indexing means with a said input from said stamping press to produce a first indexing movement;

generating a second indexing signal with said control entering into said control one of the parameters of stack height, skew angle, and nominal lamina thickness;

operating a second indexing means with said second indexing signal to produce a second indexing movement;

combining said first and second indexing movements to form a third indexing movement;

relatively rotating said first and second laminas with respect to one another in accordance with said third indexing movement; and after said relatively rotating step stacking said first and second laminas.

18. The method according to claim 17 wherein said second indexing means comprises a servo motor.

19. The method according to claim 17 wherein said relative rotation is at least 30°.

20. An indexing system for use with a stamping press for manufacturing a stack of laminas from sheet stock material, said stack having desired parameters of stack height and skew, said laminas having a thickness dimension, said indexing system rotationally indexing the laminas relative to one another, said indexing system comprising:

a first indexing movement generator adapted to be driven from a said stamping press for generating a first indexing movement;

an input means for inputting at least one value selected from said desired parameters and said lamina thickness dimension;

a controller for generating an indexing signal based on said selected value;

a second indexing movement generator for generating a second indexing movement in response to said indexing signal; and     means for combining said first and second movements into an output movement for rotating laminas relative to one another.

21. The indexing system of claim 20 wherein said second indexing generator comprises a servo motor.

22. The indexing system according to claim 20 wherein said first indexing mean comprises a roller cam assembly.

23. The indexing system according to claim 20 wherein said means for combining comprises a phase adjuster.

24. An indexing system for use in a stamping apparatus for manufacturing lamina stacks from individual laminas said laminas, having a thickness parameter, said stack having stack height and skew angle parameters, said indexing system comprising:

a first indexing movement generator for generating a fixed indexing movement;

an input terminal for entering an input parameter selected from one of said stack and lamina parameters;

a control operatively connected to said input terminal for generating a control signal in response to said input parameter;

a second indexing movement generator connected to said control for generating a dynamically variable indexing movement in response to said control signal; and     means for combining said fixed and variable movements into an output movement for rotating a laminas and a partial stack of laminas relative to one another.

25. A method for rotating laminas relative to a stack of laminas in a die assembly, said laminas having a thickness parameter, said stack having stack height and skew parameters, said method comprising;

generating a fixed indexing movement;

entering a parameter selected from said lamina and stack parameters into an entry terminal;

generating a variable indexing movement based on said entered parameter;

combining said fixed and variable indexing movements into a rotational movement; and     rotating a lamina and a partial stack of laminas relative to one another based on said rotational movement.

* * * * *

UNITED STATES PATENT AND TRADEMARK OFFICE
CERTIFICATE OF CORRECTION

PATENT NO. : 5,881,450
DATED : March 16, 1999
INVENTOR(S) : Thomas R. Neuenschwander It is certified that error appears in the above-identified patent and that said Letters Patent is hereby corrected as shown below:

Claim 17, Col. 10, Line 10, delete "generating a second indexing signal with said control entering into said control one of the parameters of stack height, skew angle, and nominal lamina thickness;" and insert --entering into said control one of the parameters of stack height, skew angle, and nominal lamina thickness; generating a second indexing signal with said control;--

Signed and Sealed this

Eighteenth Day of April, 2000

Attest:

Q. TODD DICKINSON

*Attesting Officer*     *Director of Patents and Trademarks*